United States Patent

Shinji

[11] Patent Number: 5,715,269
[45] Date of Patent: Feb. 3, 1998

[54] ION LASER APPARATUS

[75] Inventor: Toshitake Shinji, Tokyo, Japan

[73] Assignee: NEC Corporation, Tokyo, Japan

[21] Appl. No.: 723,353

[22] Filed: Sep. 30, 1996

[30] Foreign Application Priority Data

Sep. 29, 1995 [JP] Japan .................... 7-276569

[51] Int. Cl.$^6$ .................... H01S 3/097; H01S 3/134
[52] U.S. Cl. .................... 372/55; 372/23; 372/32; 372/37
[58] Field of Search .................... 372/9, 20, 23, 372/29, 32, 33, 37, 38, 55, 56, 57, 81, 82

[56] References Cited

U.S. PATENT DOCUMENTS

| | | | |
|---|---|---|---|
| 3,622,908 | 11/1971 | Skolnick | 372/32 |
| 3,931,589 | 1/1976 | Aisenberg et al. | 372/37 X |
| 4,748,632 | 5/1988 | Preston | 372/32 |
| 5,280,536 | 1/1994 | Dumond et al. | 372/82 |

FOREIGN PATENT DOCUMENTS

| | | |
|---|---|---|
| 62-193755 | 12/1987 | Japan . |
| 64-6058 | 1/1989 | Japan . |
| 1-152682 | 6/1989 | Japan . |

Primary Examiner—John D. Lee
Attorney, Agent, or Firm—Sughrue, Mion, Zinn, Macpeak & Seas, PLLC

[57] ABSTRACT

An ion laser apparatus capable of simultaneous oscillation at a plurality of wavelengths is provided, which makes it possible to stabilize not only the overall output beam but also each component of the output beam. A laser tube having a pair of optical mirrors at each end is driven by a first electric current, thereby causing a specific electric discharge in the tube. A magnetic-field generator is driven by a second electric current, thereby generating a specific magnetic field in the tube to focus or collect a plasma generated in the tube. An optical beam splitter splits a reference beam generated from the output laser beam into first and second feedback beams. First and second detectors detect the feedback beams to thereby generate first and second electric signals, respectively. The electric discharge in the tube is controlled by the use of the first electric signal, and the magnetic field in the tube is controlled by the use of the second electric signal. The fact that the magnetic field has an optimum value which varies dependent upon the wavelength value of the second feedback beam is used for stabilizing each component of the output beam.

11 Claims, 5 Drawing Sheets

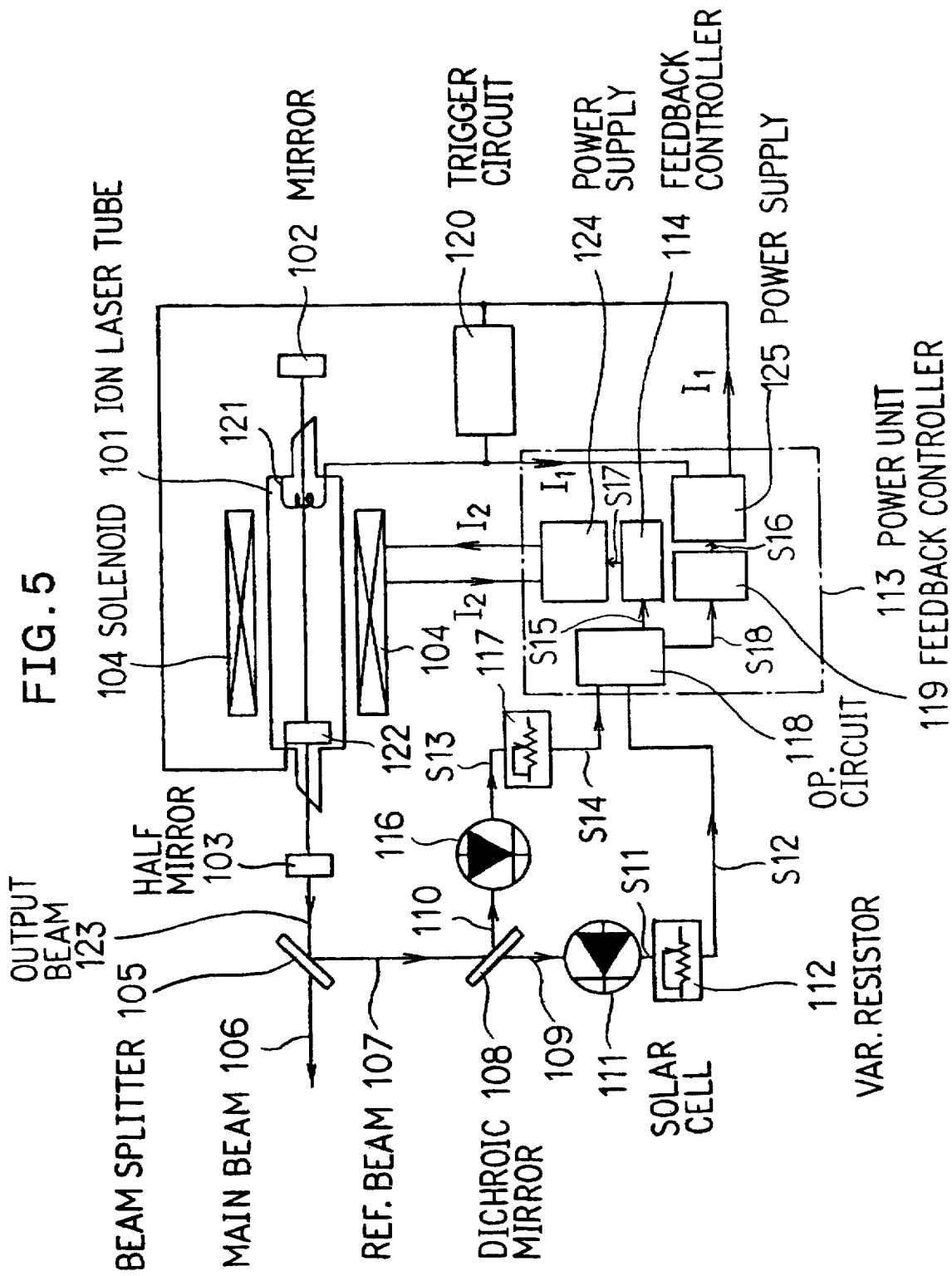

5,715,269

ION LASER APPARATUS

BACKGROUND OF THE INVENTION

1. Field of the Invention

The present invention relates to an ion laser apparatus and more particularly, to an ion laser apparatus capable of simultaneous oscillation at a plurality of wavelengths.

2. Description of the Prior Art

An ion laser apparatus such as an argon ion laser, a krypton ion laser typically has a plurality of laser oscillation wavelengths.

The ion laser apparatus has a variety of application fields. In an application field such as a light source for a printer, a visualizer and the like, the laser apparatus is used to simultaneously oscillate at a plurality of wavelengths and therefore, the intensity or strength of the optical output beam is important.

In another application field such as the Raman spectroscopy, holography or the like, the laser apparatus is used to selectively oscillate at a single wavelength.

In a further application field such as the spectroscopy, microscopic analysis and medical care, the laser apparatus is used to simultaneously oscillate at a plurality of wavelengths, and at the same time, the components of the optical output beam having different frequencies may play their own roles, respectively. In this application field, the electric power and power ratio of each component of the output beam are important.

It is pointed out that the discharge current and voltage of the ion laser tube, the strength of a magnetic field for focusing/collecting the plasma in the tube, the pressure of the Gaseous laser medium placed in the tube are typical parameters for effectively controlling the output of the ion laser apparatus.

FIG. 1 shows a conventional argon laser apparatus disclosed in the Japanese No-Examined Utility-Model Publication No. 62-193755, which was published in December 1987. In this apparatus, the respective components of the output beam containing different oscillation wavelengths are controlled without adjusting the gas pressure of the laser medium.

As shown in FIG. 1, the argon laser apparatus 215 contains a laser tube 201 in which an argon gas is filled as a laser medium. The tube 201 has a pair of optical mirrors 202 and 203 located at each end thereof. The pair of mirrors 202 and 203 constitute an optical resonator. An optical output beam 204 is emitted from one end of the tube 201 toward an optical beam splitter 205. The splitter 205 splits the output beam 204 into a main beam 206 and a reference beam 207.

The reference beam 207 is separated by a wavelength selector 208 such as a dichroic mirror into a transmitted beam 210 and a reflected beam 209. The transmitted beam 210 is then received by a solar cell 211 as an optical detector, thereby outputting an electric signal 212 corresponding to the intensity of the beam 210 to a power supply 213.

The power supply 213 supplies an electric power to the laser tube 201 through a trigger circuit 214 in response to the electric signal 212, thereby feedback controlling the output beam 204 through a feedback circuit (not shown).

With the conventional laser apparatus 215 shown in FIG. 1, only one component of the output beam 204 having a specific wavelength such as 488 nm or 514.5 nm is selectively controlled by changing the type of the wavelength selector 208. The electric power of the output beam 204 itself is not controlled.

A similar laser apparatus to that shown in FIG. 1 is disclosed in the Japanese No-Examined Utility-Model Publication No. 64-6058, which was published in January 1989. This apparatus has the same configuration as that of FIG. 1 except that the reflected beam 209 is then received by another solar cell as an optical detector, thereby outputting another electric signal corresponding to the beam 209.

The two electric signals corresponding to the beams 210 and 209 are added by an adder to thereby output an electric feedback signal.

The power supply 213 receives the feedback signal and supplies an electric power to the laser tube 201 through a trigger circuit 214 in response to the feedback signal, thereby controlling the output beam 204 through a feedback circuit (not shown).

FIG. 2 shows a further conventional ion laser apparatus disclosed in the Japanese No-Examined Patent Publication No. 1-152682, which was published in June 1989. In this apparatus also, the respective components of the output beam containing different oscillation wavelengths are controlled without adjusting the gas pressure of the laser medium.

As shown in FIG. 2, this apparatus contains a laser tube 301, a pair of optical mirrors 302 and 305 for an ultraviolet region of spectrum, and a pair of optical mirrors 303 and 306 for a visible region of spectrum. The mirrors 302 and 303 are located on a mirror mount 304. The mirrors 305 and 306 are located on a mirror mount 307. The mounts 304 and 307 are disposed at each end of the laser tube 301. The pair of mirrors 302 and 305 constitute an optical resonator. The pair of mirrors 303 and 306 constitute another optical resonator.

The apparatus further contains an electric magnet 308 outside the tube 301 so as to surround the tube 301. The magnet 308 generate a magnetic field in the tube 301 to focus/collect a plasma generated in the tube 301 under the control of a magnet control circuit 312.

The applied voltage to the magnet 308 for the ultraviolet or visible region is selected by a switch including a movable contact bar 315 and two fixed contacts 313 and 314, thereby providing two different values of the magnetic field.

The combination of the mirrors 302 and 305 for the ultraviolet region and the combination of the mirrors 303 and 306 for the visible region are selectively used for wanted laser oscillation. The selection or switching of the two combinations is performed by synchronously moving the mounts 304 and 307. The selection or switching of the applied voltage to the magnet 308 (i.e., the magnetic field in the tube 301) is performed by selectively contacting the movable contact bar 315 with one of the fixed contacts 313 and 314.

The selection of the mirror combination and the applied voltage is synchronously carried out.

With the conventional laser apparatus shown in FIG. 2, since the magnetic field in the tube 301 is selected according to the use of the combination of the mirrors 302 and 305 or 303 and 306, the laser is capable of laser oscillation at a wanted wavelength within the ultraviolet or visible region under the optimum condition.

However, the conventional laser apparatuses described above has the following difficulties.

In the conventional laser apparatus shown in FIG. 1, only one of the components of the output beam 204 having a wanted wavelength can be selectively controlled. The components of the beam 204 having unselected wavelengths cannot be controlled. As a result, the electric power ratio of the selected component to the overall beam 204 cannot be controlled.

Furthermore, in the conventional laser apparatus shown in FIG. 2, one of the two output beams having different wavelengths within the ultraviolet and visible regions is selectively controlled, which is similar to the apparatus in FIG. 1. As a result, the same difficulty as that of the apparatus of FIG. 1 will occur.

Accordingly, in the conventional apparatuses shown in FIGS. 1 and 2, the following problem will occur.

At the start of the operation, where the distribution of the gas filled in the laser tube 201 or 301 as a laser medium and the temperature within the tube 201 or 301 do not reach their thermal equilibrium yet, the individual components of the output beam having different oscillation wavelengths are subjected to different effects. Similarly, when the gas pressure in the tube 201 or 301 fluctuates with time, the individual components of the output beam are differently affected.

Consequently, the electric power of each component of the output beam cannot be kept stable, which results in the fluctuation in the electric power of the overall output beam. This means that the electric power ratio of each component of the output beam to the overall output beam cannot be kept stable.

SUMMARY OF THE INVENTION

Accordingly, an object of the present invention is to provide an ion laser apparatus capable of simultaneous oscillation at a plurality of wavelengths which makes it possible to stabilize the level of the overall output beam and a component thereof.

Another object of the present invention is to provide an ion laser apparatus capable of simultaneous oscillation at a plurality of wavelengths which makes it possible to stabilize the level of each component of the output beam.

Still another object of the present invention is to provide an ion laser apparatus capable of simultaneous oscillation at a plurality of wavelengths which makes it possible to stabilize the level ratio of each component of the output beam to the overall output beam.

An ion laser apparatus according to the present invention has a laser tube in which a gas laser medium is placed. The laser tube is driven by a first electric current, thereby causing a specific electric discharge in the laser tube. A pair of optical mirrors are disposed at each end of the laser tube, thereby constituting an optical resonator.

A magnetic-field generator is disposed outside the laser tube. The generator is driven by a second electric current, thereby generating a specific magnetic field in the tube to focus/collect a plasma generated in the tube.

A first optical beam splitter is disposed in an optical path of an optical output beam emitted from the laser tube. The first beam splitter splits the output beam into a main beam and a reference beam.

A second optical beam splitter splits the reference beam into a first feedback beam and a second feedback beam.

A first optical detector detects the first feedback beam, outputting a first electric signal corresponding to the first feedback beam. A second optical detector detects the second feedback beam, outputting a second electric signal corresponding to the second feedback beam.

A first electric controller controls the first electric current according to the first electric signal. A second electric controller controls the second electric current according to the second electric signal.

The electric discharge and the magnetic field are simultaneously controlled through the first and second electric currents, respectively.

With the ion laser apparatus according to the present invention, to control the electric discharge in the laser tube, the first electric controller controls the first electric current corresponding to the first feedback beam through the first electric signal. Also, to control the magnetic field in the laser tube, the second electric controller controls the second electric current corresponding to the second feedback beam through the second electric signal.

The magnetic field has an optimum value which varies dependent upon the wavelength value of the second feedback beam.

Consequently, if the first feedback beam is designed to contain all the wavelengths of the output beam and the second feedback beam to contain a single specific wavelength, the overall output beam is stabilized by controlling the electric discharge through the first electric current, and each component of the output beam is stabilized by controlling the magnetic field through the second electric current.

This means that not only the overall output beam but also each component of the output beam can be stabilized.

Further, since both of the overall output beam and a component thereof can be stabilized, the level ratio of the component to the overall output beam can be stabilized.

If the first feedback beam is designed to contain a first wavelength of the output beam and the second feedback beam to contain a second specific wavelength different from the first wavelength, the first component of the output beam having the first wavelength is stabilized by controlling the electric discharge through the first electric current, and the second component of the output beam having the second wavelength is stabilized by controlling the magnetic field through the second electric current.

This means that the level of each component of the output beam can be stabilized.

Further, since of the level of each component is stabilized, the level ratio of these components also can be stabilized.

In a preferred embodiment of the invention, the first feedback beam contains all oscillation wavelengths and the second feedback beam contains a single oscillation wavelength. The output beam is controlled by the first controller through the first feedback beam. A component of the output beam containing the single oscillation wavelength is controlled by the second controller through the second feedback beam.

In this case, it is preferred that the first and second controllers control the first and second electric currents so that the level ratio of the component to the overall output beam is kept constant, respectively.

In another preferred embodiment of the invention, the first feedback beam contains a first oscillation wavelength and the second feedback beam contains a second oscillation wavelength which is different in value from the first oscillation wavelength. A first component of the output beam containing the first oscillation wavelength is controlled by the first controller through the first feedback beam, and a second component of the output beam containing the second oscillation wavelength is controlled by the second controller through the second feedback beam.

In this case, it is preferred that the first and second controllers control the first and second electric currents so that the level ratio of the first and second components is kept constant, respectively.

In still another preferred embodiment of the invention, an optical filter is provided in an optical path of the second feedback beam between the second beam splitter and the second detector. The filter allows a component of the second feedback beam containing a single oscillation wavelength to be transmitted selectively. The first feedback beam containing all oscillation wavelengths is transmitted to the first detector.

In this case, the output beam is controlled by the first controller through the first feedback beam, and a component of the output beam containing the single oscillation wavelength is controlled by the second controller through the second feedback beam.

In a further preferred embodiment of the invention, an operation circuit is provided for performing a specific operation or calculation between the first and second feedback beams. The electric discharge and the magnetic field are controlled based on the result of the operation or calculation.

The specific operation or calculation may be set as necessary. However, addition, subtraction or division is preferably used.

In a still further preferred embodiment of the invention, the second beam splitter has a function of wavelength separation, and the first feedback beam contains a first oscillation wavelength and the second feedback beam contains a second oscillation wavelength different in value from the first oscillation wavelength.

In this case, a first component of the output beam containing the second oscillation wavelength is controlled by the first controller through the first feedback beam, and a second component of the output beam containing the second oscillation wavelength is controlled by the second controller through the second feedback beam.

BRIEF DESCRIPTION OF THE DRAWINGS

In order that the invention may be readily carried into effect, it will now be described with reference to the accompanying drawings.

FIG. 5 is a block diagram of an ion laser apparatus according to a second embodiment of the present invention.

DETAILED DESCRIPTION OF THE PREFERRED EMBODIMENTS

Figure 1:
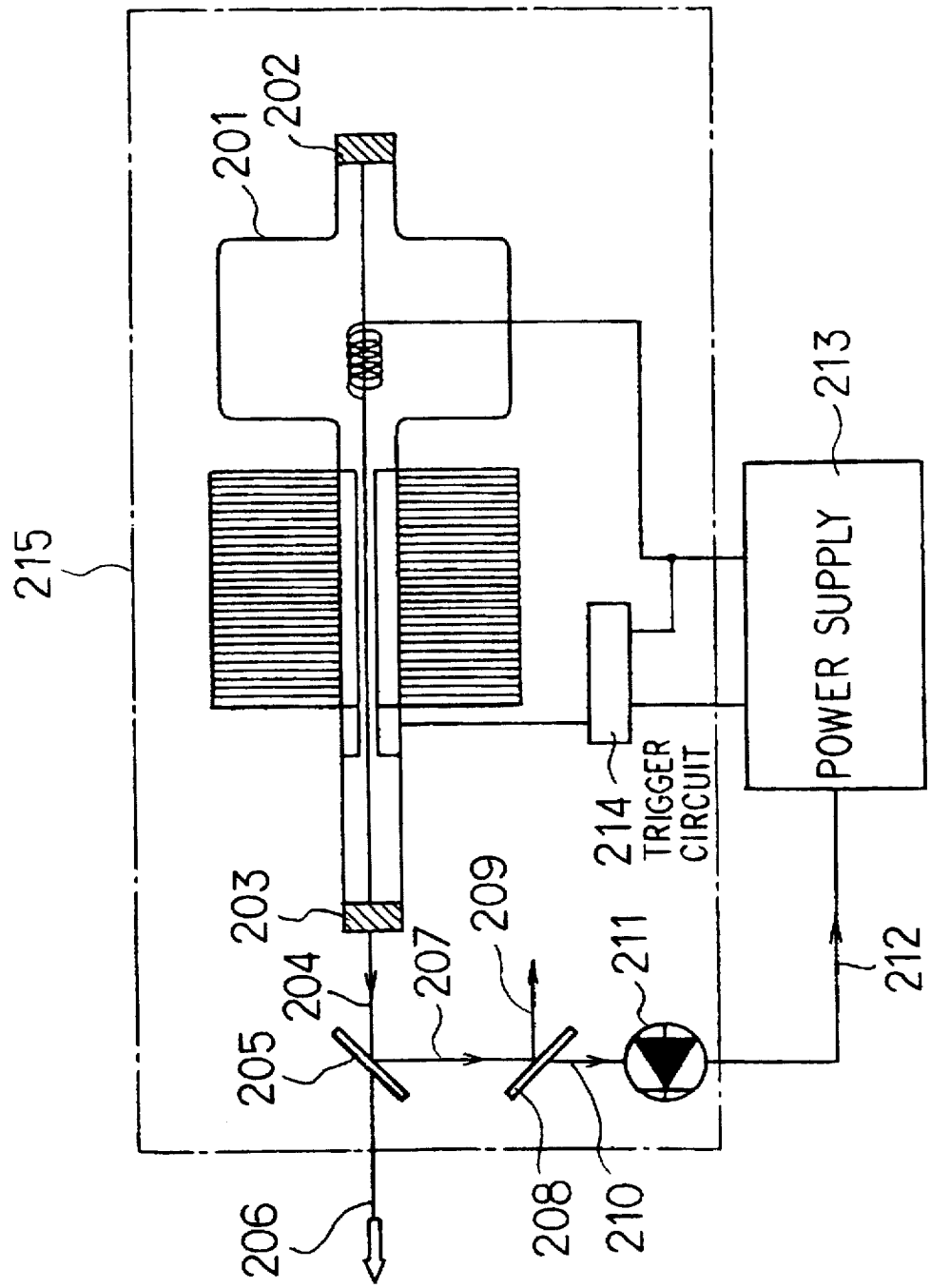
FIG. 1 is a block diagram of a conventional ion laser apparatus.
Figure 2:
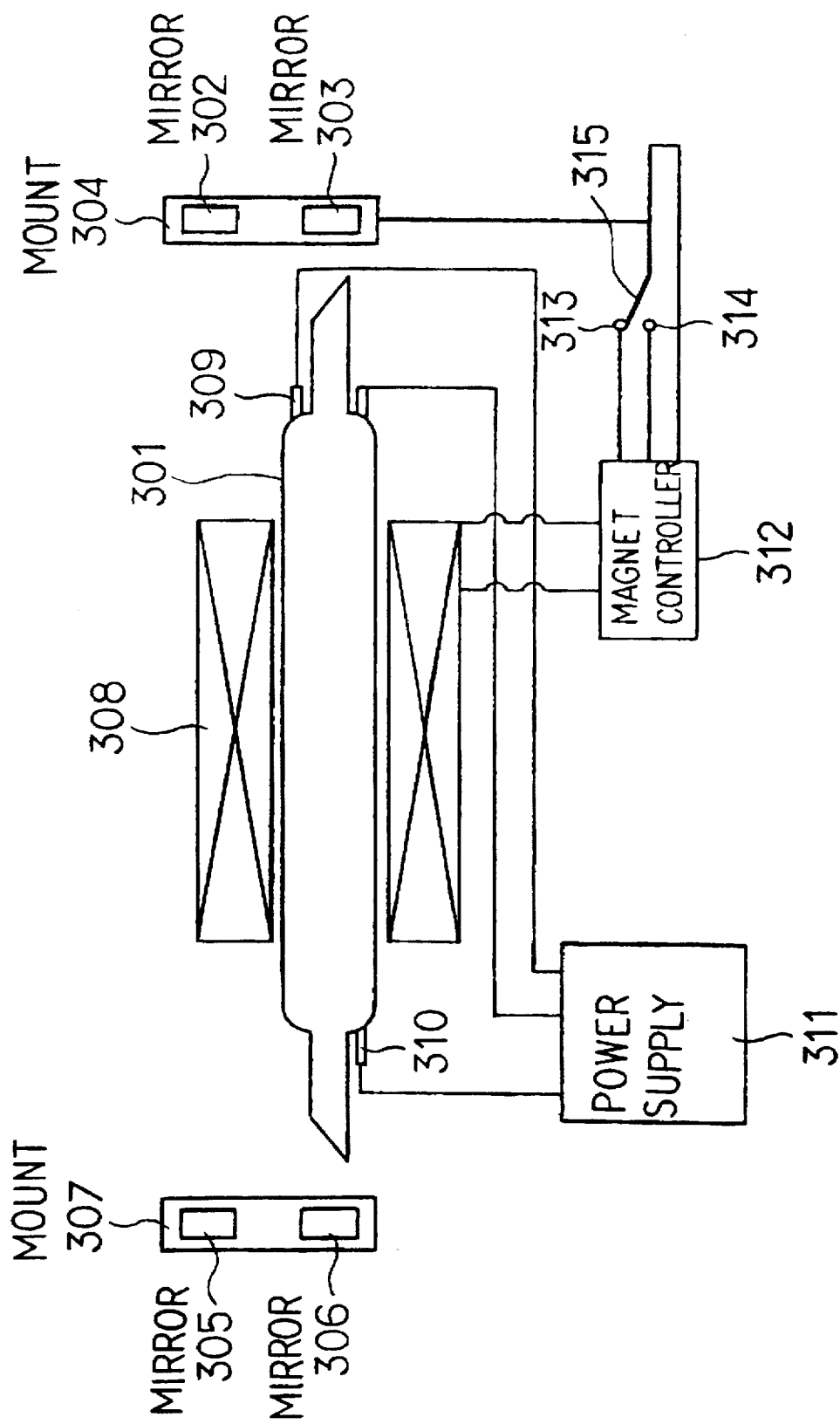
FIG. 2 is a block diagram of another conventional ion laser apparatus.

Preferred embodiments of this invention will be described below by referring to the drawings.

First Embodiment

Figure 3:
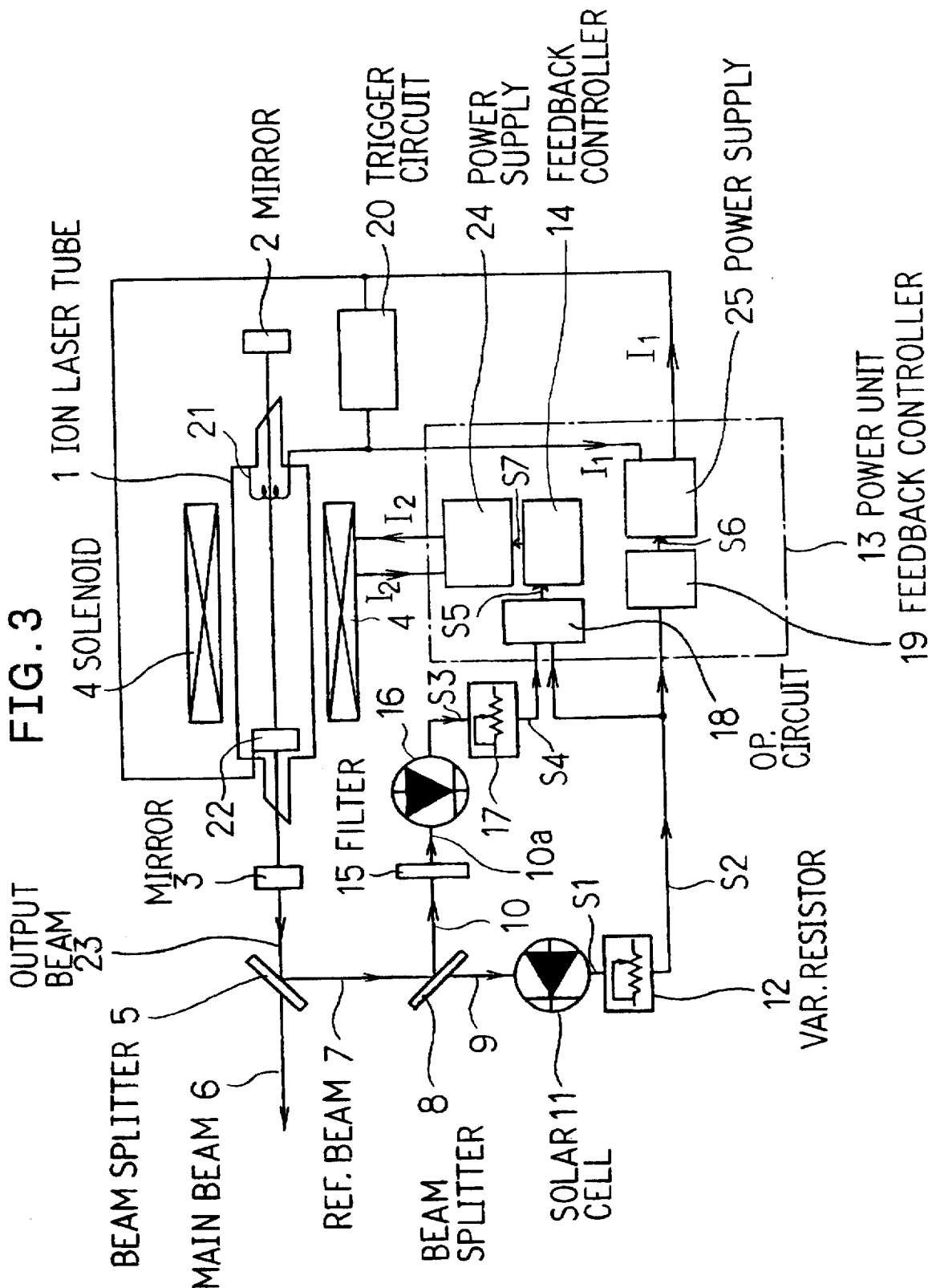
FIG. 3 is a block diagram of an ion laser apparatus according to a first embodiment of the present invention.

An ion laser apparatus according to a first embodiment of the invention is shown in FIG. 3, in which the apparatus has an ion laser tube 1 in which a gaseous laser medium such as an argon or krypton gas is filled, and a pair of optical mirrors 2 and 3 constituting an optical resonator. The pair of mirrors 2 and 3 are disposed outside to be opposite with each other at each side of the tube 1.

A cathode 21 and an anode 22 are disposed in the tube 1 at each end thereof.

An electric solenoid 4 is fixed outside the laser tube 1 so as to surround the tube 1. The solenoid 4 generates a magnetic field in the tube 1 to thereby focus or collect a plasma caused in the tube 1.

An optical output beam 23 is emitted from one end of the tube 1 to the outside of the tube 1 through the mirror 3.

A first optical beam splitter 5 is placed in the optical path of the output beam 23. The splitter 5 receives the output beam 23 and splits it into a main optical beam 6 and a reference optical beam 7. The main beam 6, which is a transmitted beam, contains all the wavelengths of the output beam 23 and is used for a wanted purpose. The reference beam 7, which is a reflected beam, contains all the wavelengths of the output beam 23 and is used for monitoring and controlling the output beam 23.

A second optical beam splitter 8 is placed in the optical path of the reference beam 7. The splitter 8 receives the beam 7 and splits it into a first feedback beam 9 and a second feedback beam 10. The first feedback beam 9, which is a transmitted beam, contains all the wavelengths of the output beam 23. The second feedback beam 10, which is a reflected beam, contains all the wavelengths of the output beam 23.

A first solar cell 11 is placed in the optical path of the first feedback beam 9. The solar cell 11 receives and detects the feedback beam 9, thereby outputting a first electric signal S1 corresponding to the intensity or electric power of beam 9.

The first electric signal S1 is sent to an electric power unit 13 through a variable resistor 12. The resistor 12 serves to compensate the sensitivity difference of the cell 11. A compensated electric signal of The signal S1 is defined as S2.

An optical filter 15 is placed in the optical path of the second feedback beam 10. The filter 15 serves to filter The beam 10, thereby producing a filtered second feedback beam 10a having a single specific wavelength.

A second solar cell 16 is placed in the optical path of the filtered second feedback beam 10a. The solar cell 12 receives and detects the feedback beam 10a, thereby outputting a second electric signal S3 corresponding to the intensity or electric power of the beam 10a.

The second electric signal S3 is sent to the electric power unit 13 through a variable resistor 17. The resistor 17 serves to compensate the sensitivity difference of the cell 16. A compensated electric signal of the signal S3 is defined as S4.

The power unit 13 includes an operation or calculation circuit 18, a first feedback controller circuit 19, a first power supply 25, a second feedback controller circuit 14, and a second power supply 24.

The first feedback controller circuit 19 directly receives the first compensated electric signal S2 and outputs an electric signal S6 to the first power supply 25. In response to the signal S6, the first power supply 25 supplies an electric power to the laser tube 1. As a result, an electric current $I_1$ flows through the cathode and anode 21 and 22 of the laser tube 1, thereby causing an electric discharge in the laser tube 1. Thus, the driving or discharge current $I_1$ is adjusted under the feedback control of the first feedback controller circuit 19, thereby controlling the electric power of the optical output beam 23 at a specific level.

Since the electric signal S2 corresponds to the first feedback beam 9 having all the wavelengths of the output beam 23, the overall electric power of the beam 23 is stabilized by means of the control of the discharge current $I_1$.

On the other hand, the operation or calculation circuit 18 receives the first and second compensated electric signals S2 and S4 and performs a predetermined operation or calculation between the signals S2 and S4 thus received. The circuit 18 outputs an electric signal S5 corresponding to the result of the operation or calculation to the second feedback controller circuit 14.

As the operation or calculation in the circuit 18, for example, subtraction or division for the two signals S2 and S4 is performed in order to keep the electric power ratio of the beam 10a to the beam 9 at a specific value.

The second feedback controller circuit 14 receives the electric signal S5 and outputs an electric signal S7 to the second power supply 24. In response to the signal S7, the second power supply 24 supplies an electric power to the solenoid 4. As a result, an electric current $I_2$ flows through the solenoid 4, thereby causing a magnetic field in the laser tube 1. Thus, the solenoid current $I_2$ is adjusted under the feedback control of the second feedback controller circuit 14, thereby controlling the electric power of the component of the output beam 23 having the single specific wavelength at a specific level.

Since the electric signal S5 corresponds to the operation/calculation result for the first and second feedback beams 9 and 10, the electric power of the component or the electric power ratio to the output beam 23 is stabilized by means of the control of the solenoid current $I_2$.

Figure 4:
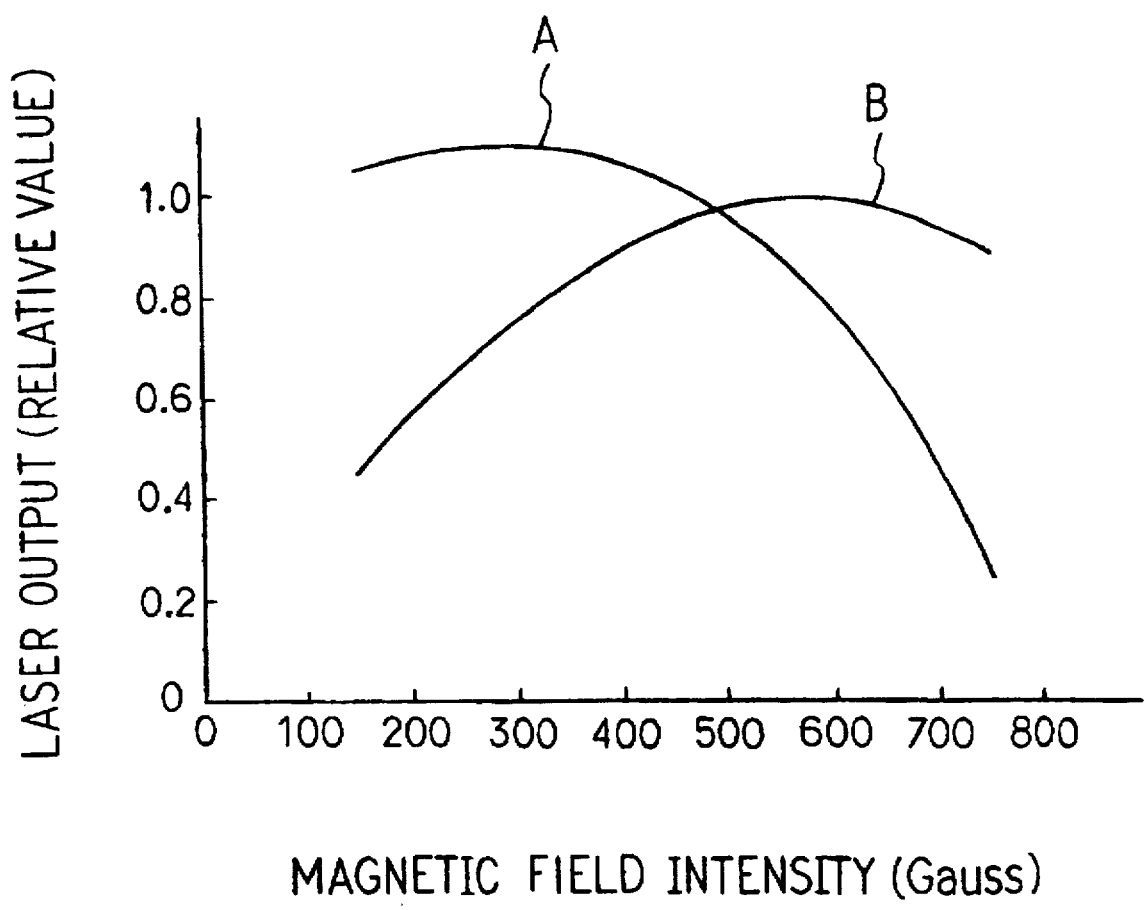
FIG. 4 is a graph showing the laser output dependence of a krypton laser apparatus as a function of the magnetic field intensity, in which the laser output beam has a wavelength of 647.1 nm, 568.2 nm, or 530.9 nm and the krypton gas pressure is 1.5 Torr.

FIG. 4 shows the laser output dependence of a krypton laser apparatus as a function of the magnetic field intensity, in which the laser output beam has a wavelength of 647.1 nm, 568.2 nm, or 530.9 nm and the krypton gas pressure is 1.5 Torr. The curve A is for 647.1 nm and the curve B is for 568.2 nm and 530.9 nm.

It is seen from FIG. 4 that the optical output varies dependent upon the intensity of the magnetic field in the tube 1 and that the optimum value of the intensity changes according to the wavelength. Based on these facts, the electric power of the optical beam component corresponding to the filtered second feedback beam 10a having the single specific wavelength can be controlled by the change of the solenoid current $I_2$ (i.e., the magnetic field in the tube 1).

As described above, with the ion laser apparatus according to the first embodiment, to control the electric discharge in the laser tube 1, the first feedback controller circuit 19 controls the discharge or tube current $I_1$ corresponding to the first feedback beam 9 through the first electric signal S2. Also, to control the magnetic field in the laser tube 1, the second feedback controller circuit 14 controls the solenoid current $I_2$ corresponding to the filtered second feedback beam 10a through the second electric signal S4.

The magnetic field has an optimum value which varies dependent upon the wavelength value of the filtered second feedback beam 10a.

Consequently, the overall output beam 23 is stabilized by controlling the electric discharge through the discharge current $I_1$ and each component of the beam 23 is stabilized by controlling the magnetic field through the solenoid current $I_2$. This means that not only the overall output beam 23 but also each component thereof can be stabilized.

Further, since both of the overall output beam 23 and each component thereof can be stabilized, the electric power ratio of each component to the overall output beam 23 can be stabilized.

Second Embodiment

An ion laser apparatus according to a second embodiment of the invention is shown in FIG. 5, in which the electric power of the two components of the output beam is stabilized.

In FIG. 5, the apparatus has an ion laser tube 101 in which a gaseous laser medium such as an argon or krypton gas is filled, and a pair of optical mirrors 102 and 103 constituting an optical resonator. The pair of mirrors 102 and 103 are disposed outside to be opposite with each other at each side of the tube 101.

A cathode 121 and an anode 122 are disposed in the tube 101 at each end of the tube 101.

An electric solenoid 104 is fixed outside the laser tube 101 so as to surround the tube 101. The solenoid 104 generates a magnetic field in the tube 101 to thereby focus or collect a plasma caused in the tube 101.

An optical output beam 123 is emitted from one end of the tube 101 to the outside of the tube 101 through the mirror 103.

A first optical beam splitter 105 is placed in the optical path of the output beam 123. The splitter 105 receives the output beam 123 and splits it into a main optical beam 106 and a reference optical beam 107. The main beam 106, which is a transmitted beam, contains all the wavelengths of the output beam 123 and is used for a wanted purpose. The reference beam 107, which is a reflected beam, contains all the wavelengths of the output beam 123 and is used for monitoring and controlling the output beam 123.

A dichroic mirror 108 as a second optical beam splitter is placed in the optical path of the reference beam 107. The dichroic mirror 108 receives the beam 107 and splits it into a first feedback beam 109 and a second feedback beam 110. The first feedback beam 109, which is a transmitted beam, contains a first wavelength of the output beam 123. The second feedback beam 110, which is a reflected beam, contains a second wavelength of the output beam 123 different in value from the first wavelength.

A first solar cell 111 is placed in the optical path of the first feedback beam 109. The solar cell 111 receives and detects the feedback beam 109, thereby outputting a first electric signal S11 corresponding to the intensity or electric power of beam 109.

The first electric signal S11 is sent to an electric power unit 113 through a variable resistor 112. The resistor 112 serves to compensate the sensitivity difference of the cell 111. A compensated electric signal of the signal S11 is defined as S12.

Unlike the first embodiment, no optical filter is placed in this second embodiment, because the dichroic mirror 108 is provided.

A second solar cell 116 is placed in the optical path of the second feedback beam 110. The solar cell 112 receives and detects the feedback beam 110, thereby outputting a second electric signal S13 corresponding to the intensity or electric power of beam 110.

The second electric signal S13 is sent to the electric power unit 113 through a variable resistor 117. The resistor 117 serves to compensate the sensitivity difference of the cell 116. A compensated electric signal of the signal S13 is defined as S14.

The power unit 113 includes an operation or calculation circuit 118, a first feedback controller circuit 119, a first power supply 125, a second feedback controller circuit 114, and a second power supply 124.

The operation or calculation circuit 118 receives the first and second compensated electric signals S12 and S14, and performs two predetermined operations, i.e., division or comparison and addition, between the signals S12 and S14 thus received. The circuit 118 outputs an electric signal S15 corresponding to the result of the division/comparison operation to the second feedback controller circuit 114 and at the same time, it outputs an electric signal S18 corresponding to the result of the addition operation to the first feedback controller circuit 119.

The first feedback controller circuit 119 receives the electric signal S18 and outputs an electric signal S16 to the first power supply 125. In response to the signal S16, the first power supply 125 supplies an electric power to the laser tube 101. As a result, an electric current $I_1$ flows through the cathode and anode 121 and 122 of the laser tube 101, thereby causing an electric discharge in the laser tube 101. Thus, the driving or discharge current $I_1$ is adjusted under the feedback control of the first feedback controller circuit 119, thereby controlling the electric power of the first component of the output beam 123 at a specific level.

Since the electric signal S18 corresponds to the sum of the first and second feedback beams 109 and 110, the electric power of the sum of the first and second components is stabilized by means of controlling the discharge current $I_1$.

On the other hand, since the electric signal S15 corresponds to the division or comparison of the first and second feedback beams 109 and 110, the electric power of the difference or ratio of the first and second components is stabilized by means of controlling the solenoid current $I_2$.

As described above, with the ion laser apparatus according to the second embodiment, to control the electric discharge in the laser tube 101, the first feedback controller circuit 119 controls the discharge current $I_1$ corresponding to the sum of the first and second feedback beams 109 and 110 through the first and second electric signals S12 and S14. Also, to control the magnetic field in the laser tube 101, the second feedback controller circuit 114 controls the solenoid current $I_2$ corresponding to the division or comparison of the first and second feedback beams 109 and 110 through the first and second electric signals S12 and S14.

Consequently, the sum level of the first and second components of the output beam 123 is stabilized by controlling the electric discharge through the discharge current $I_1$, and the level difference or ratio of the first and second components of the beam 123 is stabilized by controlling the magnetic field through the solenoid current $I_2$.

As described above, according to the apparatus of the invention, the hydrodynamic and/or thermal instabilities of the gaseous laser medium, which tend to takes place at the start of operation, can be compensated, resulting in the stabilized output level and/or ratio of the output beam. Furthermore, the effect caused by the time-dependent pressure reduction of the laser medium also can be compensated. This means that the level or ratio of the output beam can be effectively stabilized.

It is needless to say that the wavelengths of the output beam 23 or 123 may belong to the visible, infrared or ultraviolet region of spectrum in the invention.

While the preferred forms of the present invention have been described, it is to be understood that modifications will be apparent to those skilled in the art without departing from the spirit of the invention. The scope of the invention, therefore, is to be determined solely by the following claims.

What is claimed is:

1. An ion laser apparatus capable of simultaneous oscillation at a plurality of wavelengths, comprising:

a laser tube in which a gas laser medium is placed, said laser tube being driven by a first electric current, thereby causing a specific electric discharge in said laser tube;

a pair of optical mirrors disposed at each end of said laser tube, said pairs of optical mirrors constituting an optical resonator;

a magnetic-field generator disposed outside said laser tube, said magnetic-field generator being driven by a second electric current, thereby generating a specific magnetic field in said laser tube to focus or collect a plasma generated in said laser tube;

a first optical beam splitter disposed in an optical path of an optical output beam emitted from said laser tube, said first beam splitter splitting said output beam into a main beam and a reference beam;

a second optical beam splitter for splitting said reference beam into a first feedback beam and a second feedback beam;

a first optical detector for detecting said first feedback beam, said first optical detector outputting a first electric signal corresponding to said first feedback beam;

a second optical detector for detecting said second feedback beam, said second optical detector outputting a second electric signal corresponding to said second feedback beam;

a first electric controller for controlling said first electric current according to said first electric signal; and a second electric controller for controlling said second electric current according to said second electric signal;

wherein said electric discharge and said magnetic field are simultaneously controlled through said first and second electric currents, respectively.

2. The apparatus as claimed in claim 1, wherein said first feedback beam contains all oscillation wavelengths and said second feedback beam contains a single oscillation wavelength;

and wherein said output beam is controlled by said first controller through said first feedback beam, and a component of said output beam containing said single oscillation wavelength is controlled by said second controller through said second feedback beam.

3. The apparatus as claimed in claim 2, wherein said first and second controllers control said first and second electric currents so that a ratio of said component of said output beam to said overall output beam is kept constant, respectively.

4. The apparatus as claimed in claim 1, wherein said first feedback beam contains a first oscillation wavelength and said second feedback beam contains a second oscillation wavelength which is different in value from said first oscillation wavelength;

and wherein a first component of said output beam containing said first oscillation wavelength is controlled by said first controller through said first feedback beam, and a second component of said output beam containing said second oscillation wavelength is controlled by said second controller through said second feedback beam.

5. The apparatus as claimed in claim 4, wherein said first and second controllers control said first and second electric currents so that a ratio of said first and second components of said output beam is kept constant, respectively.

6. The apparatus as claimed in claim 1, further comprising an optical filter in an optical path of said second feedback beam between said second beam splitter and said second detector;

wherein said filter allows a component of said second feedback beam containing a single oscillation wavelength to be transmitted selectively;

and wherein said first feedback beam containing all oscillation wavelengths is transmitted to said first detector.

7. The apparatus as claimed in claim 6, wherein said output beam is controlled by said first controller through said first feedback beam, and a component of said output beam containing said single oscillation wavelength is controlled by said second controller through said second feedback beam.

8. The apparatus as claimed in claim 1, further comprising an operation circuit for performing a specific operation between said first and second feedback beams;

wherein said electric discharge and said magnetic field are controlled based on the result of said operation.

9. The apparatus as claimed in claim 8, wherein said specific operation is one of addition, subtraction and division.

10. The apparatus as claimed in claim 1, wherein said second beam splitter has a function of wavelength separation;

and wherein said first feedback beam contains a first oscillation wavelength and said second feedback beam contains a second oscillation wavelength different in value from said first oscillation wavelength.

11. The apparatus as claimed in claim 10, wherein a first component of said output beam containing said second oscillation wavelength is controlled by said first controller through said first feedback beam, and a second component of said output beam containing said second oscillation wavelength is controlled by said second controller through said second feedback beam.

\* \* \* \* \*

UNITED STATES PATENT AND TRADEMARK OFFICE
CERTIFICATE OF CORRECTION

PATENT NO. : 5,715,269
DATED : February 3, 1998
INVENTOR(S) : Shinji

It is certified that error appears in the above-identified patent and that said Letters Patent is hereby corrected as shown below:

Column 6, line 31, delete "output ting" and insert --outputting--.

Signed and Sealed this

Eighth Day of September, 1998

*Attest:*

BRUCE LEHMAN

*Attesting Officer*         *Commissioner of Patents and Trademarks*